3,352,652
METHOD OF PRODUCING FUEL GAS
Robert W. Belfit, Jr., Midland, Mich., assignor to The Dow Chemical Company, Midland, Mich., a corporation of Delaware
No Drawing. Filed Jan. 21, 1964, Ser. No. 339,085
19 Claims. (Cl. 48—197)

ABSTRACT OF THE DISCLOSURE

Process for the preparation of a fuel gas containing one or more of the components which are explosive in high concentrations. The process provides for recovering such explosive components from a fluid stream containing the same and combining such components with other constituents of the fuel gas in a manner such that a substantially non-explosive composition is maintained at all times. This is achieved by extracting the explosive component from a fluid stream containing the same into a selective solvent therefor, adding to said solvent specified proportions of hydrocarbon diluents and separating the fuel gas mixture from the selective solvent.

---

This invention relates to a method of producing a fuel gas containing methyl acetylene, allene, or mixtures thereof, and more particularly to a method for producing a fuel gas wherein explosive concentrations of methyl acetylene, allene, or mixtures thereof are avoided.

Methyl acetylene, allene, and mixtures thereof are well known as fuel gases. They are particularly useful for gases employed in flame cutting operations. These gases are, however, explosive when found in concentrations greater than about 80 mole percent. Because of the explosion hazard present when handling methyl acetylene or allene, substantial excess amounts (more than about 60 mole percent) of carrier gases are usually employed. When the methyl acetylene or allene concentration is less than about 40 mole percent, the heating value of the gas mixture has little advantage over known fuel gases, such as propane.

It is an object of this invention to provide a method of producing a fuel gas containing methyl acetylene, allene, or mixtures thereof which is substantially free of explosion hazard.

It is another object of the present invention to provide a method of producing a fuel gas which may be liquefied safely for storage or transportation.

It is a further object of the present invention to provide a safe method of producing a fuel gas which has a high heat value.

Other objects and advantages of the present invention will become apparent in the course of the following specification.

Methyl acetylene and allene are produced by a variety of different methods. Included are such methods as the thermal cracking of naphthas, the cracking of isobutylene, the decomposition of a dihalopropane or a monohalopropene, and the heating of a dihalopropane in the presence of an aqueous solution of an alkali metal hydroxide.

Ordinarily, gaseous product streams from processes of the type mentioned hereinbefore and other similar processes contain substantial amounts of materials not desirable in fuel gas compositions.

Methyl acetylene, allene, or mixtures thereof may be selectively extracted from a gaseous stream containing other materials by contacting the gaseous stream with a suitable liquid extractant. Suitable liquid extractants are those which will selectively remove and dissolve methyl acetylene and allene from gaseous mixtures containing other components. Typical suitable extractants are phenol, furfural, $\beta,\beta$-dichloro diethyl ether, and dimethyl formamide.

It has now been discovered that when a novel mixture of gases hereinafter referred to as "diluent" is mixed with the extractant which contains methyl acetylene and/or allene, hereinafter called "primary fuel," in certain proportions and the combination thus formed is distilled, a gaseous product is obtained which is an excellent fuel gas, is substantially non-explosive, and which may be compressed and liquefied if desired.

The term "diluent," in accordance with the present invention, means a mixture containing two essential components. The first component consists of propane, propylene, or mixtures thereof. The second component consists of saturated hydrocarbons containing four carbon atoms, ethylenically unsaturated hydrocarbons containing four carbon atoms, or mixtures thereof. Appropriate four carbon hydrocarbons suitable for use as the second diluent component are: n-butane, isobutane, 1-butene, 2-butene, butadiene, iso-butene, and mixtures thereof.

First and second components of diluent, in accordance with the present invention, are present in a mole ratio of from about 0.8 to about 19 moles of first component per mole of second component.

Diluent is mixed with the primary fuel and extractant in an amount of from about 0.333 to about 1.1 and preferably from about 0.333 to about 0.667 mole of diluent per mole of primary fuel. Mixing may be accomplished batch-wise, or may be on a continuous basis, if desired.

Once mixing of diluent with the primary fuel-containing extractant is accomplished, the combination unexpectedly may be distilled to obtain the desired fuel gas composition. Distillation may be accomplished in a conventional manner.

Distillate fuel gas compositions obtained in accordance with the present invention contain from about 48 to about 75 and preferably from about 60 to about 75 mole percent of primary fuel (methyl acetylene, allene, or mixtures thereof), from about 11 to about 38 mole percent of propane, propylene, or mixtures thereof, and from about 2 to about 14 mole percent of saturated hydrocarbons containing four carbon atoms, ethylenically unsaturated hydrocarbons containing four carbon atoms, or mixtures thereof.

These fuel gas compositions show excellent characteristics for use in flame cutting operations and may be safely compressed and liquefied for transportation and storage. Further, the fuel gas compositions obtained in accordance with the present invention show substantially constant primary fuel concentrations in both liquid and gas phases when incrementally withdrawn from liquid storage or transportation means.

One of the many advantages of the present invention is that the desired fuel gas composition is obtained without the concentration of methyl acetylene and/or allene ever reaching the level (about 80 mole percent) at which explosion hazard becomes a significant problem.

A better understanding of the present invention may be obtained in light of the following examples which are set forth to illustrate, and are not to be construed to limit, the present invention.

*Example 1.*—Diluent, consisting of propane and isobutane in a mole ratio of about 4.8 to 1, respectively, is added to a mixture of allene and methyl acetylene in dimethyl formamide. The diluent is added in a mole ratio with the allene and methyl acetylene of about 0.5 to 1. On distillation, a distillate fuel gas containing about 66.5 mole percent allene and methyl acetylene, about 28.4 mole percent propane, and about 5.1 mole percent isobutane is produced.

*Example 2.*—Diluent, consisting of propane and 1-butene in a mole ratio of about 2.5 to 1, respectively, is added to a mixture of allene in dimethyl formamide. The diluent is added in a mole ratio with the allene of about 0.5 to 1. On distillation, a distillate fuel gas containing about 65.7 mole percent allene, about 25.7 mole percent propane, and about 8.6 mole percent 1-butene is produced.

*Example 3.*—Diluent, consisting of propylene and isobutene in a mole ratio of about 2.5 to 1, respectively, is added to a mixture of allene in dimethyl formamide. The diluent is added in a mole ratio with the allene of about 0.5 to 1. On distillation, a distillate fuel gas containing about 65.6 mole percent allene, about 25.9 mole percent propylene, and about 8.5 mole percent isobutene is produced.

*Example 4.*—Diluent, consisting of propane and isobutene in a mole ratio of about 2.5 to 1, respectively, is added to a mixture of allene in dimethyl formamide. The diluent is added in a mole ratio with the allene of about 0.5 to 1. On distillation, a distillate fuel gas containing about 65.7 mole percent allene, about 25.7 mole percent propane, and about 8.6 mole percent isobutene is produced.

*Example 5.*—Diluent, consisting of propylene and 1-butene in a mole ratio of about 2.5 to 1, respectively, is added to a mixture of allene in dimethyl formamide. The diluent is added in a mole ratio with the allene of about 0.5 to 1. On distillation, a distillate fuel gas containing about 65.6 mole percent allene, about 25.9 mole percent propylene, and about 8.5 mole percent 1-butene is produced.

*Example 6.*—Diluent, consisting of propylene and n-butane in a mole ratio of about 2.5 to 1, respectively, is added to a mixture of allene in dimethyl formamide. The diluent is added in a mole ratio with the allene of about 0.5 to 1. On distillation, a distillate fuel gas containing about 66 mole percent allene, about 26 mole percent propylene, and about 8 mole percent n-butane is produced.

*Example 7.*—Diluent, consisting of propane and isobutane in a mole ratio of about 2.5 to 1, respectively, is added to a mixture of allene in dimethyl formamide. The diluent is added in a mole ratio with the allene of about 0.5 to 1. On distillation, a distillate fuel gas containing about 65.7 mole percent allene, about 25.8 mole percent propane, and about 8.5 mole percent isobutene is produced.

*Example 8.*—Diluent, consisting of propane and 1-butene in a mole ratio of about 2.5 to 1, respectively, is added to a mixture of methyl acetylene in dimethyl formamide. The diluent is added in a mole ratio with the methyl acetylene of about 0.5 to 1. On distillation, a distillate fuel gas containing about 65.5 mole percent methyl acetylene, about 26 mole percent propane, and about 8.5 mole percent 1-butene is produced.

*Example 9.*—Diluent, consisting of propane and isobutene in a mole ratio of about 2.5 to 1, respectively, is added to a mixture of methyl acetylene in dimethyl formamide. The diluent is added in a mole ratio with the methyl acetylene of about 0.5 to 1. On distillation, a fuel gas containing about 65.4 mole percent methyl acetylene, about 25.8 mole percent propane, and about 8.8 mole percent isobutene is produced.

*Example 10.*—Diluent, consisting of propylene and isobutene in a mole ratio of about 2.5 to 1, respectively, is added to a mixture of methyl acetylene in dimethyl formamide. The diluent is added in a mole ratio with the methyl acetylene of about 0.5 to 1. On distillation, a distillate fuel gas containing about 65.3 mole percent methyl acetylene, about 26 mole percent propylene, and about 8.7 mole percent isobutene is produced.

*Example 11.*—Diluent, consisting of propane and n-butane in a mole ratio of about 2.5 to 1, respectively, is added to a mixture of methyl acetylene in dimethyl formamide. The diluent is added in a mole ratio with the methyl acetylene of about 0.5 to 1. On distillation, a distillate fuel gas containing about 65.9 mole percent methyl acetylene, about 25.9 mole percent propane, and about 8.2 mole percent n-butane is produced.

*Example 12.*—Diluent, consisting of propane and isobutane in a mole ratio of about 2.5 to 1, respectively, is added to a mixture of allene and methyl acetylene in dimethyl formamide, said allene and methyl acetylene being present in a mole ratio of about 8 to 7. The diluent is added in a mole ratio with the methyl acetylene and allene of about 0.5 to 1. On distillation, a distillate fuel gas containing about 35.1 mole percent allene, about 30.4 mole percent methyl acetylene, about 25.7 mole percent propane, and about 8.8 mole percent isobutane is produced.

*Example 13.*—Diluent, consisting of propane and isobutane in a mole ratio of about 5.6 to 1, respectively, is added to a mixture of allene and methyl acetylene in dimethyl formamide, said allene and methyl acetylene being present in a mole ratio of about 8 to 7. The diluent is added in a mole ratio with the methyl acetylene and allene of about 0.6 to 1. On distillation, a distillate fuel gas containing about 34.5 mole percent allene, about 29.6 mole percent methyl acetylene, about 31.2 mole percent propane, and about 4.7 mole percent isobutane is produced.

*Example 14.*—Diluent, consisting of propane and 1,3-butadiene in a mole ratio of about 5.6 to 1, respectively, is added to a mixture of allene and methyl acetylene in dimethyl formamide, said allene and methyl acetylene being present in a mole ratio of about 1.6 to 1. The diluent is added in a mole ratio with the methyl acetylene and allene of about 0.6 to 1. On distillation, a distillate fuel gas containing about 40 mole percent allene, about 24.5 mole percent methyl acetylene, about 31 mole percent propane, and about 4.5 mole percent 1,3-butadiene is produced.

*Example 15.*—Diluent, consisting of propane and 1,3-butadiene in a mole ratio of about 5.6 to 1, respectively, is added to a mixture of allene and methyl acetylene in dimethyl formamide, said allene and methyl acetylene being present in a mole ratio of about 0.6 to 1. The diluent is added in a mole ratio with the methyl acetylene and allene of about 0.6 to 1. On distillation, a distillate fuel gas containing about 24.9 mole percent allene, about 39.5 mole percent methyl acetylene, about 31.1 mole percent propane, and about 4.5 mole percent 1,3-butadiene is produced.

*Example 16.*—Diluent, consisting of propane, propylene, and n-butane in the proportions of about 4.75 moles of propane and about 1.75 moles of propylene per mole of n-butane, respectively, is added to a mixture of allene and methyl acetylene in dimethyl formamide, said allene and methyl acetylene being present in a mole ratio of about 1.4 to 1. The diluent is added in a mole ratio with the methyl acetylene and allene of about 0.5 to 1. On distillation, a distillate fuel gas containing about 40.1 mole percent allene, about 27.7 mole percent methyl acetylene, about 21 mole percent propane, about 7.8 mole percent propylene, and about 3.4 mole percent n-butane is produced.

*Example 17.*—Diluent, consisting of propane, propylene, 1-butene, isobutene, 1,3-butadiene, isobutane, and n-butane, in the proportions of about 9.5 moles of propane and about 2.5 moles of propylene per mole of 1-butene, said isobutene, 1,3-butadiene, isobutane, and n-butane, being present in substantially equimolar quantities with the 1-butene, is added to a mixture of allene and methyl acetylene in dimethyl formamide, said allene and methyl acetylene, being present in a mole ratio of about 1.6 to 1. Diluent is added in a mole ratio with the methyl acetylene and allene of about 0.6 to 1. On distillation, a distillate fuel gas containing about 39.8 mole percent allene, about 24.6 mole percent methyl acetylene, about 20.8 mole percent propane, about 5.5 mole percent propylene, about 1.9 mole percent 1-butene, about 1.9 mole percent isobutene, about 1.9 mole percent 1,3-butadiene, about 1.9 mole percent isobutane, and about 1.7 mole percent n-butane is produced.

Various modifications may be made in the present invention without departing from the spirit or scope thereof, and it is to be understood that I limit myself only as defined in the appended claims.

I claim:
1. A method of producing non-explosive fuel gas which comprises (a) extracting a primary fuel selected from the group consisting of methyl acetylene, allene, and mixtures thereof, from a fluid mixture containing the same into a selective extractant therefor to produce an extractant containing up to about 80 mole percent of said primary fuel dissolved therein, (b) providing a diluent having two components, the first component being selected from the group consisting of propane, propylene, and mixtures thereof, the second component consisting of at least one hydrocarbon selected from the group consisting of saturated and ethylenically unsaturated hydrocarbons containing four carbon atoms, said first and second components being present in a mole ratio of from about 0.8 to about 19 moles of said first component per mole of said second component, (c) mixing said diluent and said extractant having said primary fuel dissolved therein in a mole ratio from about 0.333 to about 1.1 moles of diluent per mole of primary fuel, and (d) distilling the combination thus formed, thereby to separate extractant therefrom and thus produce a non-explosive fuel gas containing from about 0.333 to about 1.1 moles of diluent per mole of primary fuel.

2. A method of producing non-explosive fuel gas which comprises (a) extracting a primary fuel selected from the group consisting of methyl acetylene, allene, and mixtures thereof, from a fluid mixture containing the same into a selective extractant therefor to produce an extractant containing up to about 80 mole percent of said primary fuel dissolved therein, (b) providing a diluent having two components, the first component being selected from the group consisting of propane, propylene, and mixtures thereof, the second component consisting of at least one hydrocarbon selected from the group consisting of saturated and ethylenically unsaturated hydrocarbons containing four carbon atoms, said first and second components being present in a mole ratio of from about 0.8 to about 19 moles of said first component per mole of said second component, (c) mixing said diluent and said extractant having said primary fuel dissolved therein in a mole ratio from about 0.333 to about 0.667 mole of diluent per mole of primary fuel, and (d) distilling the combination thus formed to separate the extractant therefrom and thus produce a non-explosive fuel gas consisting of from about 0.333 to about 0.667 mole of diluent per mole of primary fuel.

3. A method of producing non-explosive fuel gas which comprises (a) extracting a primary fuel selected from the group consisting of methyl acetylene, allene, and mixtures thereof from a fluid mixture containing the same with dimethyl formamide, (b) providing a diluent having two components, the first component being selected from the group consisting of propane, propylene, and mixtures thereof, the second component consisting of at least one hydrocarbon selected from the group consisting of saturated and ethylenically unsaturated hydrocarbons containing four carbon atoms, said first and second components being present in a mole ratio of from about 0.8 to about 19 moles of said first component per mole of said second component, (c) mixing said diluent and said dimethyl formamide having said primary fuel dissolved therein in a mole ratio from about 0.333 to about 0.667 mole of diluent per mole of primary fuel, and (d) distilling the combination thus formed, thereby to separate dimethyl formamide therefrom and thus produce a non-explosive fuel gas consisting of a mixture of diluent and primary fuel in a mole ratio of from about 0.333 to about 0.667 mole of diluent per mole of primary fuel.

4. A method of producing non-explosive fuel gas which comprises (a) providing dimethyl formamide having a primary fuel consisting of allene and methyl acetylene dissolved therein, (b) providing a diluent consisting of propane and isobutane in a mole ratio of about 4.8 to 1, respectively, (c) mixing said diluent with said allene and methyl acetylene dissolved in dimethyl formamide in a mole ratio of about 0.5 mole of diluent per mole of methyl acetylene and allene, and (d) distilling the combination thus formed, thereby to separate dimethyl formamide therefrom and thus produce a non-explosive fuel gas consisting of a mixture of primary fuel and diluent containing about 0.5 mole percent of diluent.

5. A method of producing non-explosive fuel gas which comprises (a) providing dimethyl formamide having allene dissolved therein, (b) providing a diluent consisting of propane and 1-butene in a mole ratio of about 2.5 to 1, respectively, (c) mixing said diluent with said allene dissolved in dimethyl formamide in a mole ratio of about 0.5 mole of diluent per mole of allene, and (d) distilling the combination thus formed, thereby to separate dimethyl formamide therefrom and thus produce a non-explosive fuel gas consisting of about 0.5 mole percent diluent and about 0.5 mole percent allene.

6. A method of producing non-explosive fuel gas which comprises (a) providing dimethyl formamide having allene dissolved therein, (b) providing a diluent consisting of propylene and iso-butene in a mole ratio of about 2.5 to 1, respectively, (c) mixing said diluent with said allene dissolved in dimethyl formamide in a mole ratio of about 0.5 mole of diluent per mole of allene, and (d) distilling the combination thus formed, thereby to separate dimethyl formamide therefrom and thus produce a non-explosive fuel gas consisting of about 0.5 mole percent diluent and about 0.5 mole percent allene.

7. A method of producing non-explosive fuel gas which comprises (a) providing dimethyl formamide having allene dissolved therein, (b) providing a diluent consisting of propane and isobutane in a mole ratio of about 2.5 to 1, respectively, (c) mixing said diluent with said allene dissolved in dimethyl formamide in a mole ratio of about 0.5 mole of diluent per mole of allene, and (d) distilling the combination thus formed, thereby to separate dimethyl formamide therefrom and thus produce a non-explosive fuel gas consisting of about 0.5 mole percent diluent and about 0.5 mole percent allene.

8. A method of producing non-explosive fuel gas which comprises (a) providing dimethyl formamide having allene dissolved therein, (b) providing a diluent consisting of propylene and 1-butene in a mole ratio of about 2.5 to 1, respectively, (c) mixing said diluent with said allene dissolved in dimethyl formamide in a mole ratio of about 0.5 mole of diluent per mole of allene, and (d) distilling the combination thus formed, thereby to separate dimethyl formamide therefrom and thus produce a non-explosive fuel gas consisting of about 0.5 mole percent diluent and about 0.5 mole percent allene.

9. A method of producing non-explosive fuel gas which comprises (a) providing dimethyl formamide having allene dissolved therein, (b) providing a diluent consisting of propylene and n-butane in a mole ratio of about 2.5 to 1, respectively, (c) mixing said diluent with said allene dissolved in dimethyl formamide in a mole ratio of about 0.5 mole of diluent per mole of allene, and (d) distilling the combination thus formed, thereby to separate dimethyl formamide therefrom and thus produce a non-explosive fuel gas consisting of about 0.5 mole percent diluent and about 0.5 mole percent allene.

10. A method of producing non-explosive fuel gas which comprises (a) providing dimethyl formamide having allene dissolved therein, (b) providing a diluent consisting of propane and isobutane in a mole ratio of about 2.5 to 1, respectively, (c) mixing said diluent with said allene dissolved in dimethyl formamide in a mole ratio of about 0.5 mole of diluent per mole of allene, and (d) distilling the combination thus formed, thereby to separate dimethyl formamide therefrom and thus produce a non-explosive fuel gas consisting of about 0.5 mole percent diluent and about 0.5 mole percent allene.

11. A method of producing non-explosive fuel gas which comprises (a) providing dimethyl formamide having methyl acetylene dissolved therein, (b) providing a diluent consisting of propane and 1-butene in a mole ratio of about 2.5 to 1, respectively, (c) mixing said diluent with said methyl acetylene dissolved in dimethyl formamide in a mole ratio of about 0.5 mole of diluent per mole of methyl acetylene and (d) distilling the combination thus formed, thereby to separate dimethyl formamide therefrom and thus produce a non-explosive fuel gas consisting of about 0.5 mole percent methyl acetylene and about 0.5 mole percent diluent.

12. A method of producing non-explosive fuel gas which comprises (a) providing dimethyl formamide having methyl acetylene dissolved therein, (b) providing a diluent consisting of propane, and isobutane in a mole ratio of about 2.5 to 1, respectively, (c) mixing said diluent with said methyl acetylene dissolved in dimethyl formamide in a mole ratio of about 0.5 mole of diluent per mole of methyl acetylene, and (d) distilling the combination thus formed, thereby to separate dimethyl formamide therefrom and thus produce a non-explosive fuel gas consisting of about 0.5 mole percent methyl acetylene and about 0.5 mole percent diluent.

13. A method of producing non-explosive fuel gas which comprises (a) providing dimethyl formamide having methyl acetylene dissolved therein, (b) providing a diluent consisting of propylene and isobutene in a mole ratio of about 2.5 to 1, respectively, (c) mixing said diluent with said methyl acetylene dissolved in dimethyl formamide in a mole ratio of about 0.5 mole of diluent per mole of methyl acetylene, and (d) distilling the combination thus formed, thereby to separate dimethyl formamide therefrom and thus produce a non-explosive fuel gas consisting of about 0.5 mole percent methyl acetylene and about 0.5 mole percent diluent.

14. A method of producing non-explosive fuel gas which comprises (a) providing dimethyl formamide having methyl acetylene dissolved therein, (b) providing a diluent consisting of propane and n-butane in a mole ratio of about 2.5 to 1, respectively, (c) mixing said diluent with said methyl acetylene dissolved in dimethyl formamide in a mole ratio of about 0.5 mole of diluent per mole of methyl acetylene, and (d) distilling the combination thus formed, thereby to separate dimethyl formamide therefrom and thus produce a non-explosive fuel gas consisting of about 0.5 mole percent methyl acetylene and about 0.5 mole percent diluent.

15. A method of producing non-explosive fuel gas which comprises (a) providing dimethyl formamide having methyl acetylene and allene dissolved therein, (b) providing a diluent consisting of propane and isobutane in a mole ratio of about 2.5 to 1, respectively, (c) mixing said diluent with said allene and methyl acetylene dissolved in dimethyl formamide in a mole ratio of about 0.5 mole of diluent per mole of methyl acetylene and allene, and (d) distilling the combination thus formed, thereby to separate dimethyl formamide therefrom and thus produce a non-explosive fuel gas consisting of about 0.5 mole percent methyl acetylene and about 0.5 mole percent diluent.

16. A method of producing non-explosive fuel gas which comprises (a) providing dimethyl formamide having a mixture of allene and methyl acetylene dissolved therein, (b) providing a diluent consisting of propane and isobutane in a mole ratio of about 5.6 to 1, respectively, (c) mixing said diluent with said allene and methyl acetylene dissolved in dimethyl formamide in a mole ratio of about 0.60 mole of diluent per mole of the mixture of allene and methyl acetylene, and (d) distilling the combination thus formed, thereby to separate dimethyl formamide therefrom and thus produce a non-explosive fuel gas consisting of about 0.60 mole of diluent per mole of the mixture of methyl acetylene and allene.

17. A method of producing non-explosive fuel gas which comprises (a) providing dimethyl formamide having a mixture of allene and methyl acetylene dissolved therein, (b) providing a diluent consisting of propane and 1,3-butadiene in a mole ratio of about 5.6 to 1, respectively, (c) mixing said diluent with said allene and methyl acetylene dissolved in dimethyl formamide in a mole ratio of about 0.6 mole of diluent per mole of the mixture of methyl acetylene and allene, and (d) distilling the combination thus formed, thereby to separate dimethyl formamide therefrom and thus produce a non-explosive fuel gas consisting of about 0.60 mole of diluent per mole of the mixture of methyl acetylene and allene.

18. A method of producing non-explosive fuel gas which comprises (a) providing dimethyl formamide having a mixture of allene and methyl acetylene dissolved therein, (b) providing a diluent consisting of propane, propylene, and n-butane in the proportions of about 4.75 moles of propane and about 1.75 moles of propylene per mole of n-butane, (c) mixing said mixture of diluent with said allene and methyl acetylene dissolved in dimethyl formamide in a mole ratio of about 0.5 mole of diluent per mole of the mixture of methyl acetylene and allene, and (d) distilling the combination thus formed thereby to separate dimethyl formamide therefrom and thus produce a non-explosive fuel gas consisting of about 0.60 mole of diluent per mole of the mixture of methyl acetylene and allene.

19. A method of producing non-explosive fuel gas which comprises (a) providing dimethyl formamide having a mixture of allene and methyl acetylene dissolved therein, (b) providing a diluent consisting of propane, propylene, 1-butene, iso-butene, 1,3-butadiene, isobutane, and n-butane in the proportion of about 9.5 moles of propane and about 2.5 moles of propylene per mole of 1-butene, said isobutene, 1,3-butadiene, isobutane, and n-butane being present in substantially equimolar quantities with said 1-butene, (c) mixing said diluent with said mixture of allene and methyl acetylene dissolved in dimethyl formamide in a mole ratio of about 0.6 mole of diluent per mole of the mixture of methyl acetylene and allene; and (d) distilling the combination thus formed thereby to separate dimethyl formamide therefrom and thus produce a non-explosive fuel gas consisting of about 0.60 mole of diluent per mole of the mixture of methyl acetylene and allene.

References Cited

UNITED STATES PATENTS

| | | | |
|---|---|---|---|
| 2,146,448 | 2/1939 | Scott et al. | 260—678 X |
| 2,350,984 | 6/1944 | Britton et al. | 260—678 X |
| 3,226,213 | 12/1965 | Nelson et al. | 48—197 |

JOSEPH SCOVRONEK, Acting Primary Examiner.